(12) United States Patent  
Takai

(10) Patent No.: US 7,798,552 B2
(45) Date of Patent: Sep. 21, 2010

(54) SUN VISOR HOLDER

(75) Inventor: Shirena Takai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/125,389

(22) Filed: May 22, 2008

(65) Prior Publication Data

US 2009/0039669 A1 Feb. 12, 2009

(30) Foreign Application Priority Data

May 24, 2007 (JP) ............................ 2007-137831

(51) Int. Cl.
*B60J 3/02* (2006.01)
(52) U.S. Cl. ..................................... 296/97.9; 296/214
(58) Field of Classification Search ................ 296/97.9, 296/214; *B60J 3/02*
See application file for complete search history.

(56) References Cited

U.S. PATENT DOCUMENTS

| 5,636,891 | A | * | 6/1997 | Van Order et al. | ......... 296/37.7 |
| 6,141,837 | A | * | 11/2000 | Wisniewski | ................... 24/295 |
| 6,491,333 | B2 | * | 12/2002 | Ichikawa et al. | ........... 296/97.9 |
| 6,606,766 | B2 | * | 8/2003 | Ko | ............................... 24/295 |
| 6,799,743 | B2 | * | 10/2004 | Sawayanagi | ................ 248/27.1 |
| 7,189,112 | B2 | * | 3/2007 | Hamaguchi | .................. 439/567 |
| 7,234,209 | B2 | * | 6/2007 | Totani et al. | ................... 24/607 |
| 7,287,945 | B2 | * | 10/2007 | Lubera et al. | ............... 411/508 |
| 2002/0017800 | A1 | * | 2/2002 | Ichikawa et al. | ........... 296/97.9 |

FOREIGN PATENT DOCUMENTS

| JP | 2000-085352 | 3/2000 |
| JP | 2002-036873 | 2/2002 |
| JP | 2006-090439 | 4/2006 |

* cited by examiner

*Primary Examiner*—Patricia L Engle
*Assistant Examiner*—Pinel E Romain
(74) *Attorney, Agent, or Firm*—Rankin, Hill & Clark LLP

(57) ABSTRACT

A sun visor holder is provided which includes a holder main body 10 and a grommet 11 which is brought into engagement with the holder main body 10 so as to fix the holder main body 10 to a body of a vehicle, wherein roof lining temporary fastening pieces 40 adapted to be brought into engagement with an upper surface of a roof lining 5 and body panel engagement portions 35 adapted to be brought into engagement with an upper surface of a body panel 13 of the body are provided on the grommet 11, and lower end portions of the roof lining temporary fastening pieces 40 are positioned further upwards than a lower surface of the body panel 13 and further downwards than the upper surface of the body panel in such a state that the body panel engagement portions 35 are in engagement with the body panel 13.

3 Claims, 9 Drawing Sheets

SUN VISOR HOLDER

BACKGROUND OF THE INVENTION

1. Field of the Invention

The present invention relates to a sun visor holder which is provided on a vehicle such as a motor vehicle.

2. Description of Related Art

Sun visors are provided on a front side of a roof section in a passenger compartment of a vehicle such as a motor vehicle. A sun visor is such that a plate-shaped visor main body is supported on a rotational shaft which is disposed in a width or transverse direction of the vehicle so as to be rotated about the rotational shaft to be lowered downwards so as to interrupt the entrance of direct sunlight from the front. Furthermore, the visor main body is made to be rotated sideways about an outboard end of the rotational shaft by dislocating an inboard end of the rotational shaft of the visor main body from the sun visor holder, so as to interrupt the entrance of sunlight from the side.

The sun visor is such as to be attached to the roof portion from the inside of the passenger compartment via an interior material attached to the interior side of the roof portion, and since the attaching work needs to be carried out within a narrow space, there have been proposed various constructions for the sun visor holder.

For example, Japanese Patent Unexamined Publication JP-A-2000-85352 discloses a construction in which a temporary fastening claw which is locked on a roof lining and a fixing locking claw which is brought into engagement with a body panel are provided. In addition, Japanese Patent Unexamined Publication JP-A-2002-36873 discloses a construction in which a sun visor holder is configured to be made up of separate members such as a holder member which supports a visor main body and a grommet member which is brought into engagement with the holder member, and an engagement claw adapted to be brought into engagement with a body panel is provided on the holder member, while a holding piece adapted to be brought into engagement with the roof lining is provided on the grommet member.

Furthermore, Japanese Patent Unexamined Publication JP-A-2006-90439 discloses a construction in which a sun visor holder is configured to be made up of separate members such as a male part which supports a visor main body and a female part which is brought into engagement with the male part, and an elastic hooking claw which is brought into engagement with a body panel is provided on the male parts, while an elastic hooking piece which is brought into engagement with the body panel is provided on the female part.

However, in the sun visor holders disclosed above, when the sun visor holder is removed from the body panel, since the temporary fastening claw and the holding piece which are locked on the roof lining both need to be removed from the body panel while being contracted, there is caused a problem that the removing work becomes difficult.

In addition, in the sun visor holders disclosed above, since the sun visor is configured to be made up of the two separate parts, which are brought into engagement with the body panel and the roof lining for attachment thereto, when attempting to attach the sun visor holder to the vehicle body, if the thickness of the body panel differs, both the parts need to be renewed to match the body panel having the different thickness, and this causes a problem that the sun visor holder lacks versatility.

SUMMARY OF THE INVENTION

The invention has been made in view of these situations, and an object thereof is to provide a sun visor holder which can facilitate removing work thereof and which is so highly versatile that even when it is attempted to be used on a vehicle of which a body panel has a different thickness, the sun visor holder can be adapted to the vehicle only by modifying only one of two parts.

According to a first aspect of the invention, there is provided a sun visor holder (9) for holding detachably one end of a sun visor (S) which is supported rotatably on a vehicle body at the other thereof, including:

a holder main body (10) which includes a sun visor holding portion (16) which detachably holds the one end of the sun visor; and a grommet (11) adapted be brought into engagement with the holder for fixing the holder main body to the vehicle body, the grommet including:

a roof lining temporary fastening piece (40) which penetrates through an opening (14a) provided in a roof lining (5) and an opening (14b) provided in a body panel (13) to thereby be brought into engagement with an upper surface of the roof lining; and a body panel engagement portion (35) which is brought into abutment with an upper surface of the body panel, wherein a lower end portion of the roof lining temporary fastening piece is positioned further upwards than a lower surface of the body panel and further downwards than the upper surface of the body panel in such a state that the body panel engagement portion is in engagement with the body panel.

According to a second aspect of the invention, there is provided the sun visor holder as set forth in the first aspect of the invention, wherein the holder main body includes a roof lining abutment portion which abuts with the roof lining, and wherein a clearance is provided between a lower surface of the roof lining and the roof lining abutment portion of the holder main body in a grommet temporarily fastened state in which the roof lining temporary fastening piece is in engagement with the upper surface of the roof lining.

According to a third aspect of the invention, there is provided the sun visor holder as set forth in the first aspect of the invention, wherein the opening provided in the body panel of the body is smaller than the opening provided in the roof lining.

According to a fourth aspect of the invention, there is provided the sun visor holder as set forth in the first aspect of the invention, wherein the lower end portion of the roof lining temporary fastening piece is positioned inside the opening in the body panel and further upwards than the lower surface of the body panel and further downwards than the upper surface of the body panel.

According to the invention, even in the event that the sun visor holder is attempted to be mounted on different types of vehicles of which body panels have different thicknesses, since the sun visor holder can be applied to the various types of vehicles only by replacing the grommet of which body panel engagement portion matches the body panel, there is provided an advantage that the versatility of the sun visor holder is enhanced. In addition, when the body panel engagement portion is in engagement with the body panel, since it becomes possible to eliminate a risk that the roof lining temporary fastening piece, which is not in engagement with the body panel, constitutes a disruption to the removal of the grommet, there is provided an advantage that the removing work of the grommet is facilitated.

According to the invention, since it becomes possible to bring the roof lining temporary fastening piece into engagement with the roof lining in the temporary fastening position where the space is formed between the roof lining abutment portion and the roof lining so as to produce the temporary fastening state, there is provided an advantage that the attaching work of the roof lining is facilitated.

In addition, by bringing the roof lining abutment portion into abutment with the roof lining so as to produce the state in which the body panel engagement portion is brought into engagement with the body panel, since when the holder main body is pushed in by an amount equal to the space from the temporary fastening position, the state can be produced in which the distal end of the roof lining temporary fastening piece is positioned further upwards than the lower surface of the body panel and further downwards than the upper surface of the body panel, there is no case where the roof lining temporary fastening piece is locked on the body panel, whereby there is provided an advantage that the removing work of the grommet is facilitated.

DETAILED DESCRIPTION OF THE PREFERRED EMBODIMENTS

Hereinafter, an embodiment of the invention will be described based on the drawings. Sun visors are provided rightwards and leftwards obliquely upwards of a driver's seat and a front passenger's seat, respectively, in a passenger compartment of a vehicle such as a motor vehicle. These sun visors are such that a plate-shaped visor main body is supported on a rotational shaft which is disposed in a width or transverse direction of the vehicle so as to be rotated about the rotational shaft to be lowered downwards so as to interrupt the entrance of direct sunlight from the front, and furthermore, the visor main body is made to be rotated sideways about an outboard end of the rotational shaft by dislocating an inboard end of the rotational shaft of the visor main body from the sun visor holder. Hereinafter, a description will be made on a sun visor as an example which is provided for the driver's seat of a right-hand drive vehicle, and a description on a sun visor for the front passenger's seat will be omitted which is attached in an opposite way to the sun visor for the driver's seat.

Figure 1:
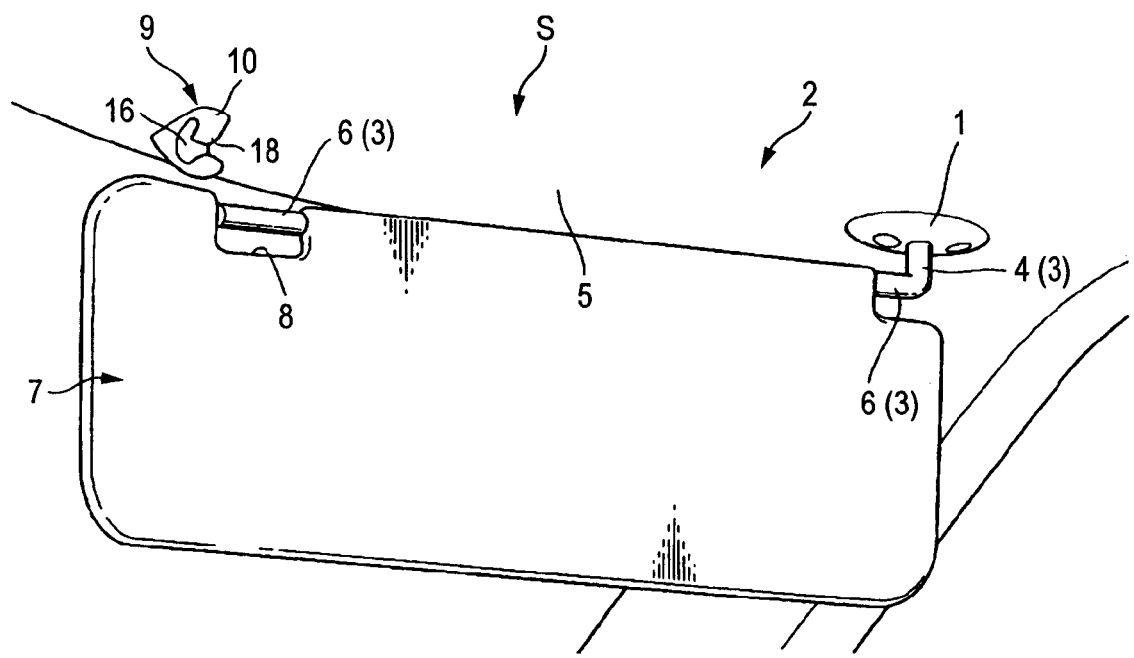
FIG. 1 is a perspective view of a main part of an embodiment of the invention.

As shown in FIG. 1, a rotational shaft 3 is supported on a roof portion 2 via a bracket 1 rightwards obliquely upwards of a driver's seat. This rotational shaft 3 is made up of a support portion 4 which extends downwards and which is supported on the bracket 1 so as to rotate in a horizontal direction and a rod portion 6 which results by bending the support portion 4 in the horizontal direction just below a roof lining 5. An upper edge of a plate-shaped visor main body 7 is supported on the rod portion 6 in such a manner that the plate-shaped visor main body 7 is rotated to be lowered downwards.

A cut-out portion 8 is formed on a portion of the upper edge of the visor main body 7 which lies further inboard so as to expose the rod portion 6. Part of the rod portion 6 is exposed in the cut-out portion 8, and this exposed rod portion 6 is such as to be detachably fixed to a sun visor holder 9 which is mounted on the roof portion 2. A sun visor S is made up mainly of the visor main body 7 and the rotational shaft 3.

Figure 2:
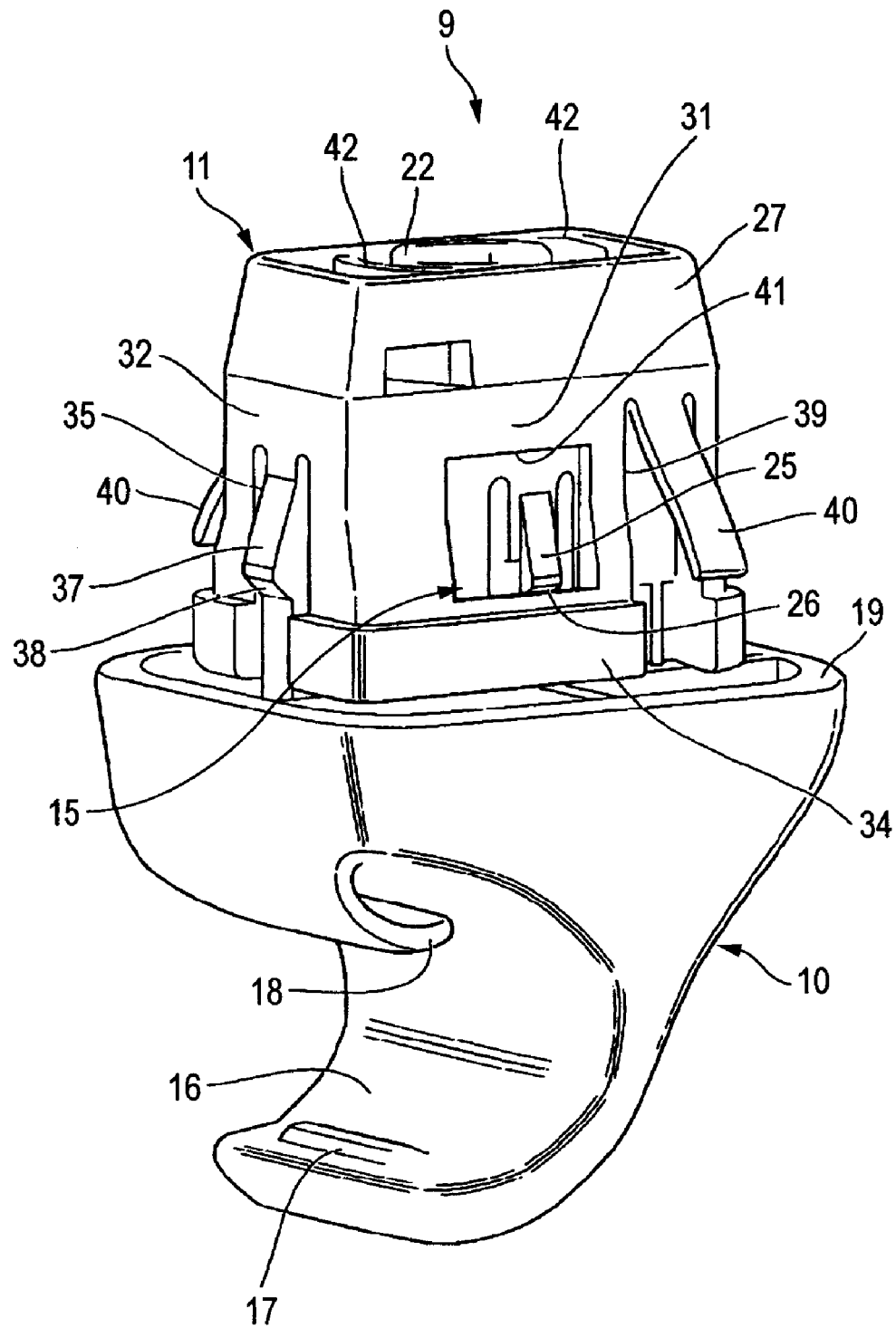
FIG. 2 is a perspective view of a sun visor holder of the embodiment of the invention.
Figure 3:
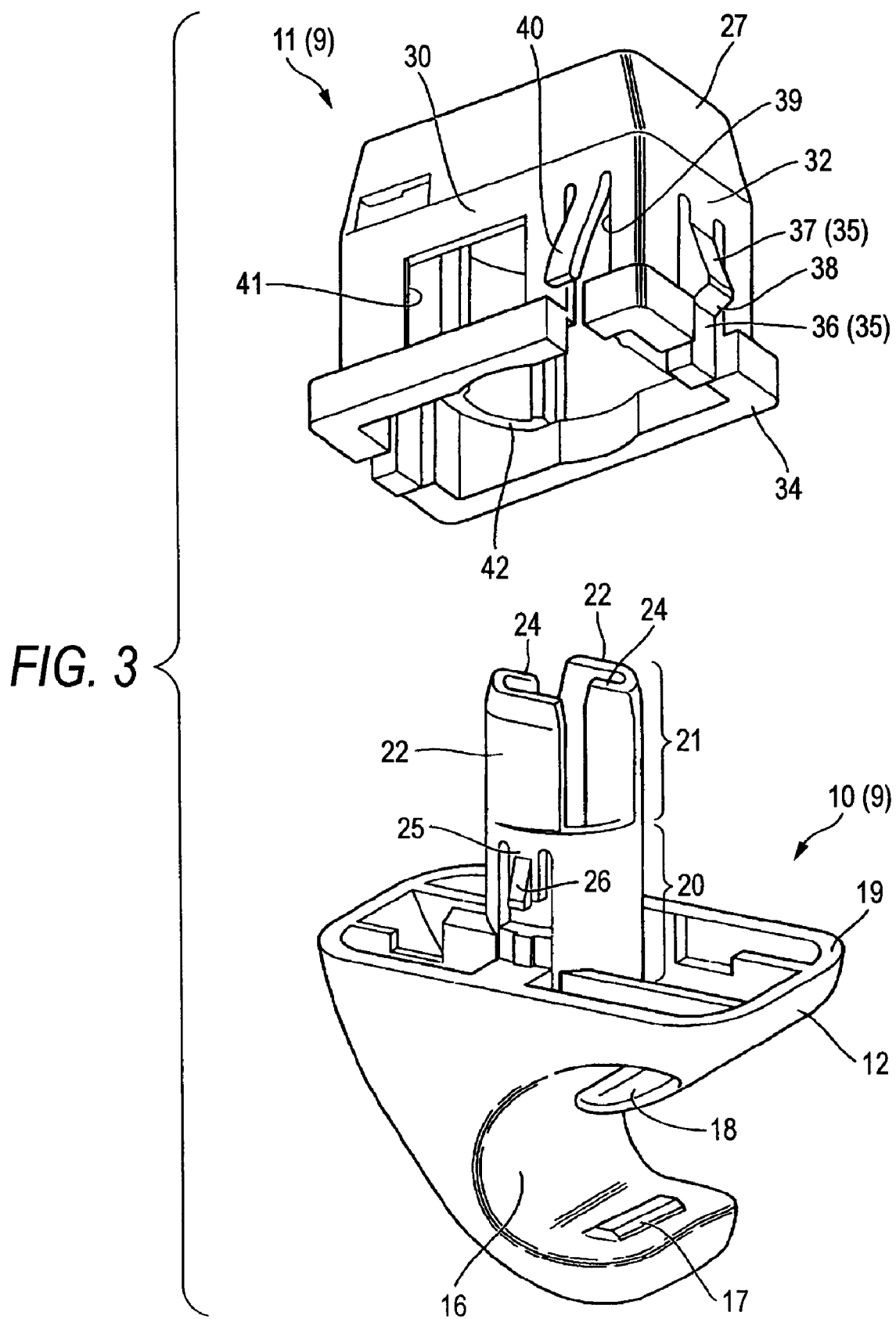
FIG. 3 is an exploded perspective view of FIG. 2.

As shown in FIGS. 2 and 3, the sun visor holder 9 includes separate parts such as a holder main body 10 which is partially exposed from a lower side (a front side) of the roof lining 5 and a grommet 11 which is disposed on an upper side (a back side) of the roof lining 5, the holder main body 10 and the grommet 11 being detachably attached to each other.

The holder main body 10 is such that a strut portion 15 is provided on a base portion 12 which is made to project further inwards into the passenger compartment than a surface of the roof lining 5 so as to extend upwards from the base portion 12 so as to penetrate upwards through openings 14a, 14b (refer to FIG. 7) which are formed in the roof lining 5 and a body panel 13, respectively, of a body of the vehicle.

A concave holding portion 16 is provided in the base portion 12 so as to be brought into engagement with the rod portion 6 of the sun visor S, and the holding portion 16 includes a locking projection 17 on a lower side and an elastic piece 18 on an upper side thereof.

The holding portion 16 is made to hold the rod portion 6 which is exposed from the cut-out portion 8 of the visor main body 7 elastically between the locking projection 17 and the elastic piece 18 and to function as a bearing for permitting a smooth rotation of the rod portion 6 when the visor main body 7 is rotated in a vertical direction about the rod portion 6.

In order to reduce the weight thereof, excess material in the interior thereof is removed from the base portion 12, and an upper end face thereof is set flat, the upper end face being made to function as a roof lining abutment portion 19 which is brought into abutment with the roof lining 5. Here, the roof lining abutment portion 19 is formed into a rectangular shape of which corner portions are chamfered or rounded as viewed from the top thereof.

The strut portion 15 is provided in a central portion of the roof lining abutment portion 19 of the base portion 12. The strut portion 15 is such as to be inserted into the grommet 11. A lower half portion 20 of the strut portion 15 which lies to face the base 12 is formed into a circular cylindrical shape. An upper half portion 21 which lies to face a leading end thereof includes a pair of grommet locking pieces 22 which is divided into two halves along an axial direction. The grommet locking piece 22 is an arc-shaped member as viewed from the top which has an outer circumferential surface substantially common to that of the lower half portion 20. When viewed from the top, the grommet locking piece 22 includes a side edge portion which turns clockwise a projecting wall 24 which bends at an acute angle at a corner portion 23 to project towards a radial center of the strut portion 15 from a longitudinal direction (refer to FIG. 6).

Grommet locking claws 25 are provided, respectively, on both transverse side portions of a circumferential wall of the lower half portion 20 of the strut portion 15. The grommet locking claw 25 is cut to rise so as to be supported at an upper portion and includes a claw 26 at a lower portion thereof. The grommet locking claw 25 does not project from an outer wall surface (an external surface of a side wall 30, 31) of the grommet 11, and unless it is pushed inwards, the claw 26 is kept locked at a lower end of an engagement opening 41 in the grommet 11 to thereby prevent an upward dislocation of the grommet 11. In addition, when the grommet 11 is rotated about the strut portion 15 of the holder main body 10 with a force of a certain magnitude, the claw 26 is pushed into an interior of the grommet 11 by a side edge of the engagement opening 41 in the grommet 11, thereby making it possible to remove the grommet 11 from the holder main body 10.

As shown in FIG. 3, the grommet 11 is a quadrangular member which is opened in upper and lower portions, which has a tapered portion 27 formed on the upper portion side and which is surrounded by the side walls 30, 31, a front wall 32 and a rear wall 33, the sidewalls 30, 31 constituting longer sides, the front wall 32 and the rear wall 33 constituting shorter sides of the quadrangular member as viewed from the top. A flange 34 is provided on the lower portion so as to project further outwards than the side walls 30, 31, the front wall 32 and the rear wall 33 so as to surround the perimeter of the lower portion. The flange 34 has a thickness-wise dimension equal to a thickness-wise dimension of the roof lining 5. Here, the front wall 32 is a wall that is oriented in the same direction in which the holding portion 16 is oriented, and the rear wall 33 is a wall which stands on an opposite side to the wall.

Body panel engagement portions 35, 35 are provided, respectively, on transverse central portions of the front wall 32 and the rear wall 33 so as to extend over locations which rise from the vicinity of vertical central portions of the front and rear walls and end at positions which surpass the flange 34 and are left free at lower ends thereof so as to extend downwards. The body panel engagement portion 35 includes an elastic arm portion 36 in which an upper end portion constitutes a proximal portion and which lies on the same plane as the front wall 32 and the rear wall 33 and a locking projection 37 having a triangular cross section which is provided further upwards than a vertical central portion of the arm portion 36. The body panel 13 is elastically captured between a lower sloping surface 38 of the locking projection 37 and an upper surface of the flange 34 which lies therebelow to thereby be held therebetween.

On the other hand, a plate-shaped roof lining temporary fastening piece 40 is provided on each of the side walls 30, 31 of the grommet 11 by cutting to raise part of each of the side walls 30, 31 in such a manner that the cut and raised part extends obliquely outwards from a cut-out portion 39 formed in each of the side walls 30, 31 as a result of the cutting and downwards. These roof lining temporary fastening pieces originate, respectively, from the vicinity of ridges defined between the side walls 30, 31 and the tapered portion 27, and as viewed from the front wall 32 of the grommet 11, the left-hand side roof lining temporary fastening piece 40 is provided on the side wall 31 in a position lying closer to the rear wall 33.

The roof lining temporary fastening piece 40 has elastic force and are hence made to be accommodated within the cut-out portion 39 by being elastically deformed, when it is pressed from the side, to a position where a distal end portion thereof comes to align with the side wall 30, 31 without interfering with the flange 34. Namely, the length of the roof lining temporary fastening piece 40 is made such that in a natural state, the roof lining temporary fastening piece 40 extends further outwards than the flange 34 at the end portion thereof, while in a temporary fastening position where the roof lining 5 surrounds the perimeter of the flange 34 and the distal end portion of the roof lining temporary fastening piece 40 is in abutment with an upper surface of the roof lining 5, the roof lining temporary fastening piece 40 is locked on the upper surface of the roof lining 5 in such a state that a clearance C is secured between the roof lining abutment portion 19 of the holder main body 10 and a lower surface of the roof lining 5 (refer to FIG. 8). In addition, the length of the roof lining temporary fastening piece 40 is set to such a length that the distal end portion thereof stays within a range equal to the thickness of the body panel 13 from the upper surface of the flange 34 of the grommet 11 in such a state that the roof lining temporary fastening piece is pushed into the cut-out portion 39.

Figure 4:
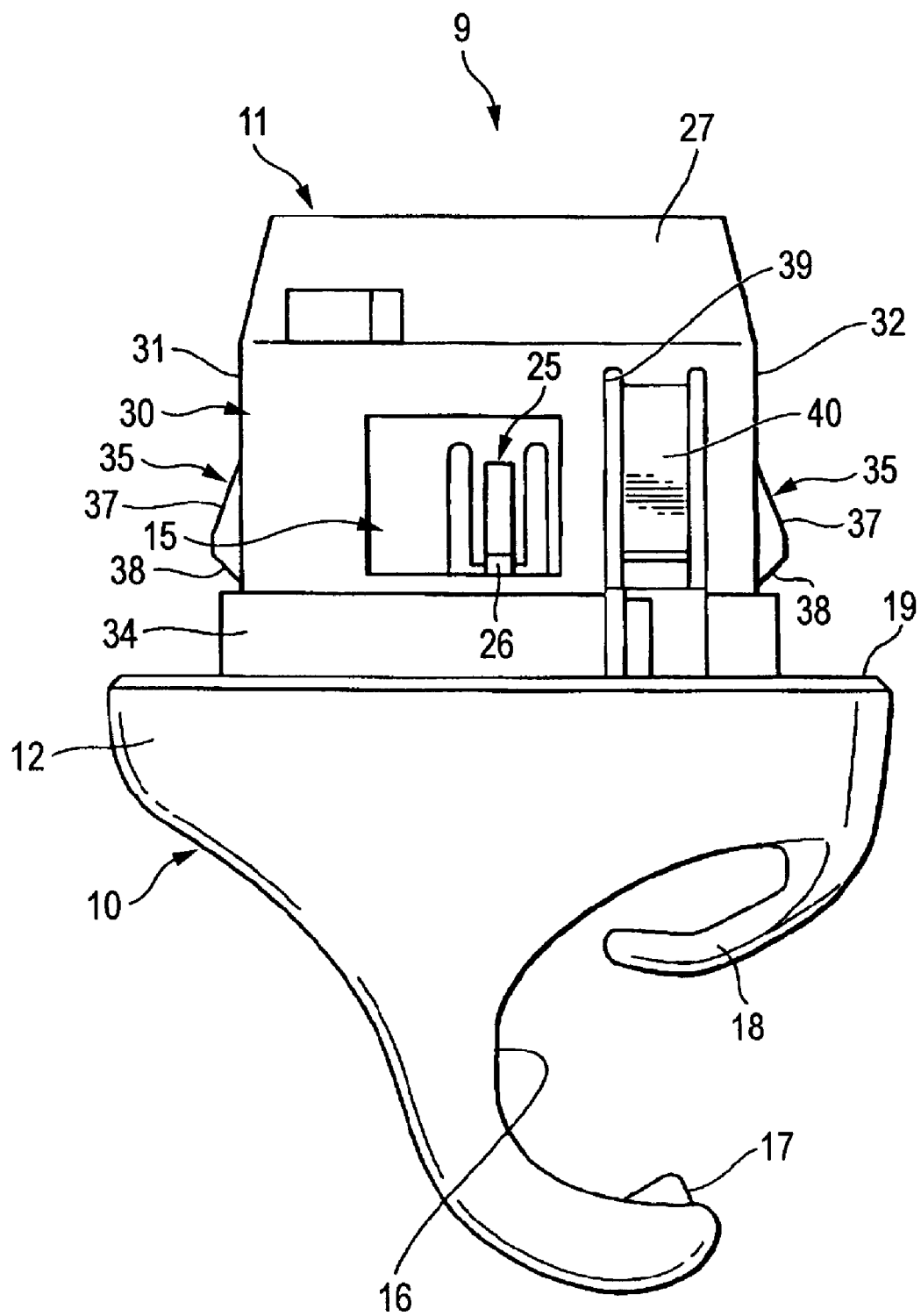
FIG. 4 is a side view of FIG. 2.
Figure 5:
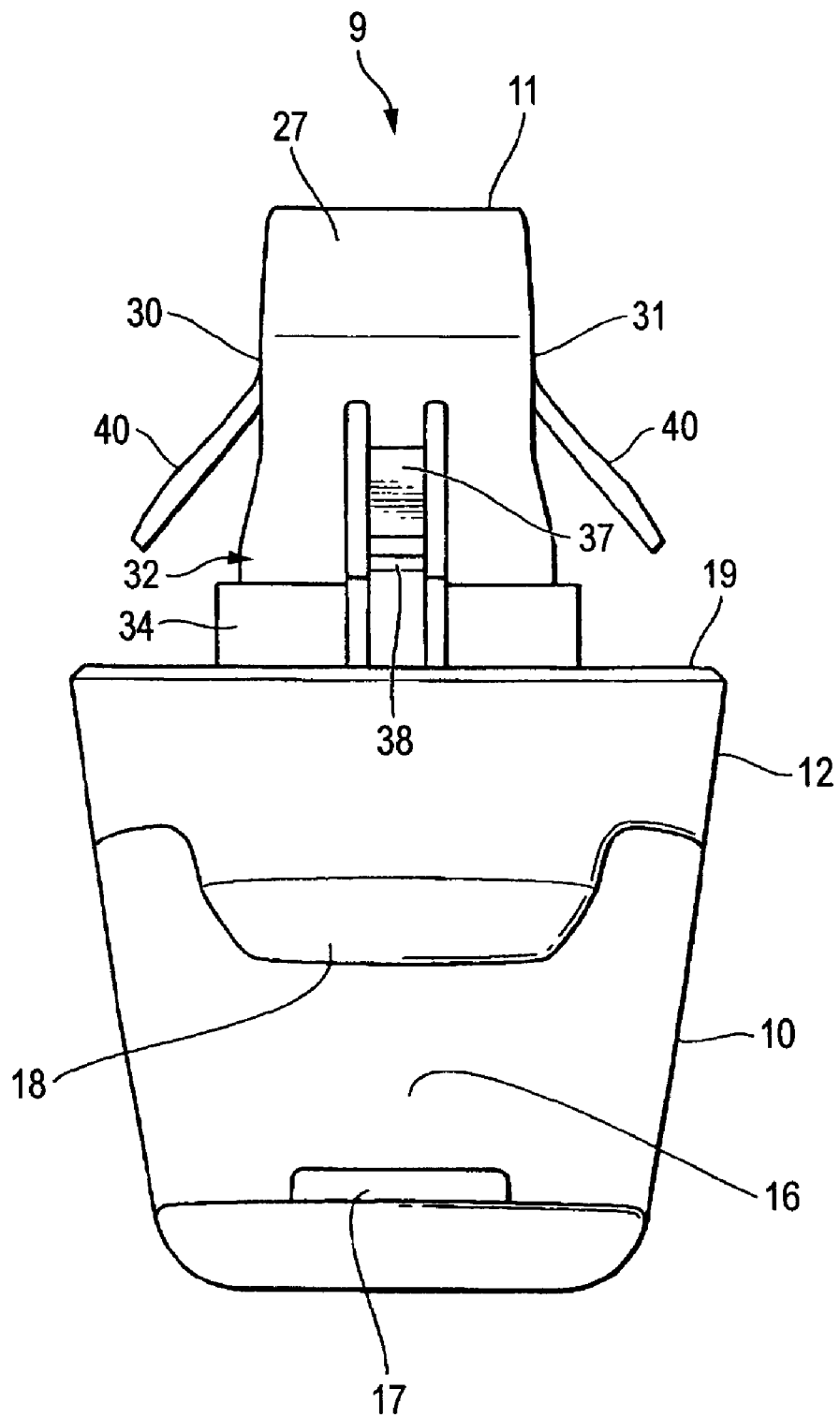
FIG. 5 is a front view of FIG. 2.
Figure 6:
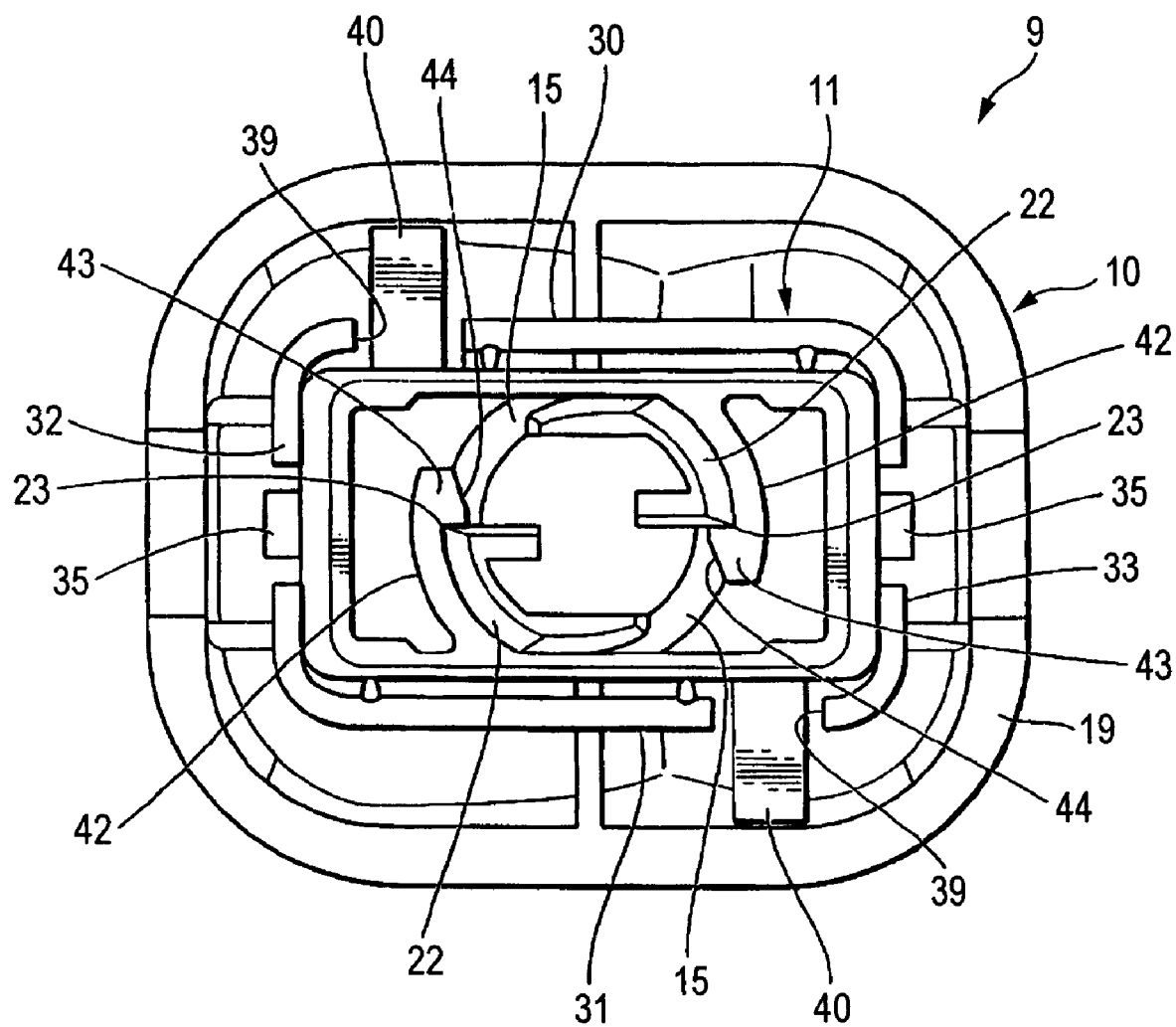
FIG. 6 is a plan view of FIG. 2.

As is also shown in FIGS. 4 to 6, in the respective side walls 30, 31 of the grommet 11, engagement openings 41 with which the grommet engagement claws 25 on the holder main body 10 are brought into engagement are formed so as to be in parallel with the roof lining temporary fastening pieces 40, respectively.

Receiving claws 42, 42 which guide and receive vertically the strut portion 15 of the holder main body 10 on front and rear sides are formed on inner surfaces of the side walls 30, 31 of the grommet 11, respectively. These receiving claws 42 are such as to make a pair to receive the grommet locking pieces 22 of the strut portion 15 on inner surfaces thereof, respectively, and each includes a locking piece claw 43 adapted to be brought into engagement with the projecting wall 24 of the grommet locking piece 22 from the transverse direction so as to lock the projecting wall 24. A riding sloping surface 44 is formed at a distal end of the locking piece claw 43 of the receiving claw 42.

When the grommet 11 is attached to the holder main body 10, the strut portion 15 of the holder main body 10 is inserted between the receiving claws 42 of the grommet 11 in such a state that the grommet 11 is rotated slightly counterclockwise as viewed from the top and that the longer sides of the grommet 11 and the holder main body 10 are made to intersect each other as viewed from the top.

When the strut portion 15 of the holder main body 10 is inserted between the receiving claws 42, the grommet 11 receives the strut portion 15 of the holder main body 10 in such a state that the riding sloping surfaces 44 of the receiving claws 42 ride on the grommet locking pieces 22, respectively. As this occurs, the grommet locking claws 25 on the holder main body 10 are not exposed from the engagement openings 41 in the side walls 30, 31 of the grommet 11 and hence are kept pressed by the inner surfaces of the side walls.

Then, when the grommet 11 is rotated clockwise in FIG. 6, the locking piece claws 43 of the grommet 11 are allowed to fall, respectively, on the projecting walls 24 at a point in time at which the locking piece claws 43 have ridden over or passed the corner portions 23 of the grommet locking pieces 22 of the holder main body 10, and the corner portions 23 of the grommet locking pieces 22 of the holder main body 10 are brought into click engagement with backs of the locking piece claws 43 (refer to FIG. 6). As this occurs, the grommet locking claws 25 provided on the strut portion 15 of the holder main body 10 are allowed to elastically restored to the outside so as to be exposed from the engagement openings 41, respectively, so as to be released from the state in which they are pressed inwards by the inner wall of the grommet 11. Therefore, since the claws 26 of the grommet locking claws 25 of the holder main body 10 are brought into engagement with the lower edges of the engagement openings 41, respectively, an outward dislocation of the grommet 11 from the holder main body 10 can be prevented.

In addition, when removing the grommet 11 from the holder main body 10, in the event that the grommet 11 is rotated counterclockwise from the state shown in FIG. 6, the locking piece claws 43 of the grommet 11 are caused to ride on the outer circumferential surfaces of the grommet locking pieces 22 in an elastic fashion from the corner portions 23 of the grommet locking pieces 22 of the holder main body 10, and the riding sloping surfaces 44 are brought into sliding contact with the outer circumferential surfaces of the grommet locking pieces 22. Then, when the grommet 11 is rotated counterclockwise further, since the grommet locking claws 25 provided on the strut portion 15 of the holder main body 10 are pressed against circumferential edges of the engagement openings 41 in the grommet 11, respectively, to thereby be withdrawn into the interior of the grommet 11, the engagement of the claws 26 of the grommet locking claws 25 on the holder main body 10 with the engagement openings 41 in the grommet 11 in the dislocating direction is released, whereby the grommet 11 can be dislocated upwards from the holder main body 10.

Figure 7:
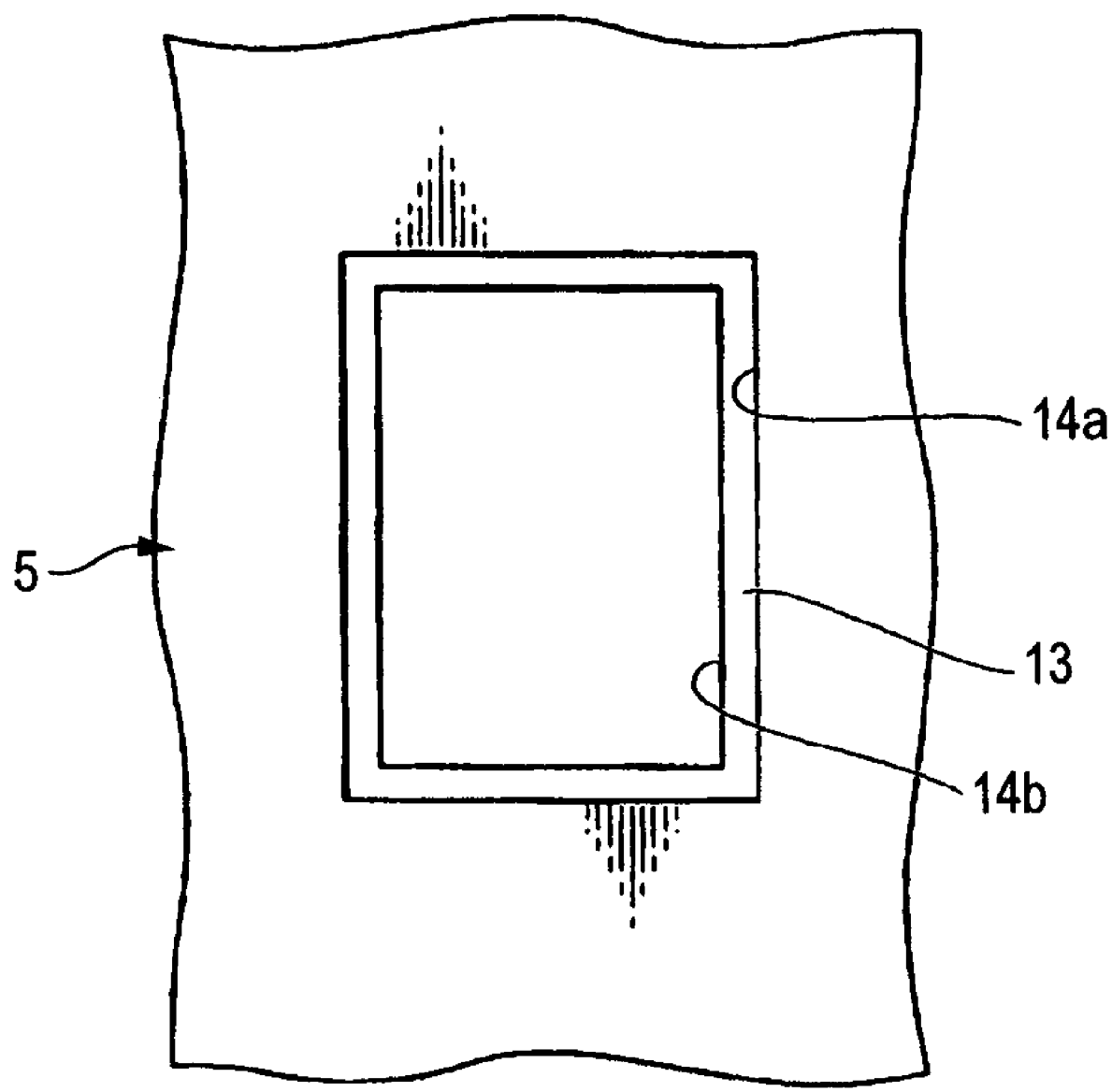
FIG. 7 is a diagram resulting when openings in a roof lining and a body panel are viewed from an inside of a passenger compartment.

According to the embodiment that has been described heretofore, as shown in FIG. 7, as to the opening 14a in the roof lining 5 and the opening 14b in the body panel 13, the opening 14b in the body panel 13 is formed in advance smaller than the opening 14a in the roof lining 5. In this state, the sun visor holder 9 is temporarily assembled in the opening 14a in the roof lining 5 before the roof lining 5 is assembled to the roof portion 2 of the body panel 13.

Figure 8:
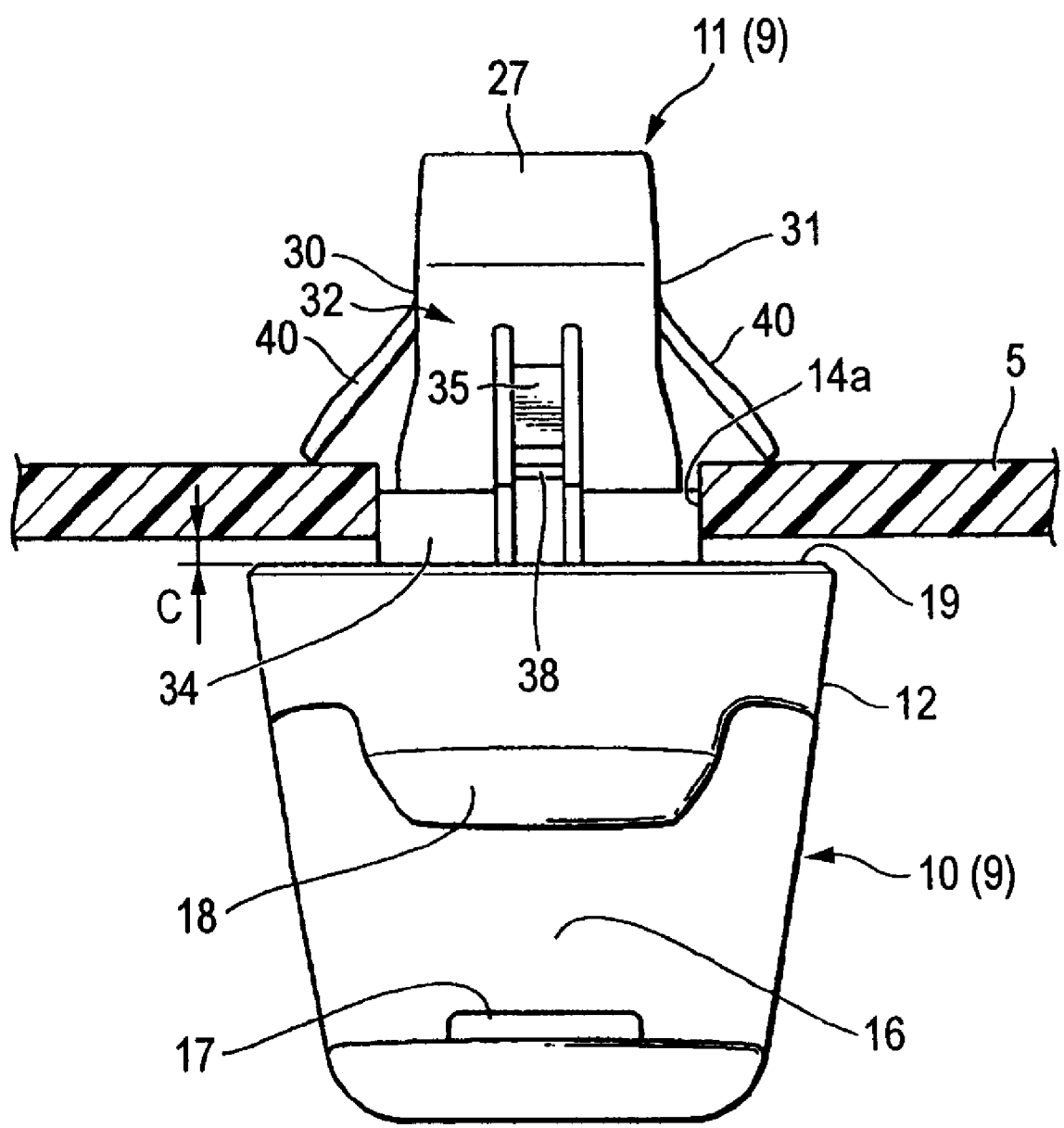
FIG. 8 is a front view showing a temporary fastening state of a sun visor holder.

Specifically, as shown in FIG. 8, the strut portion 15 of the holder main body 10 is inserted into the opening 14a in the roof lining 5 from below, the receiving claws 42 of the grommet 11 are fitted on the strut portion 15 in such a state that the grommet 11 is rotated slightly counterclockwise in the horizontal direction as viewed from the top, and the grommet 11 is then rotated clockwise so that the grommet 11 is attached to the holder main body 10 in such a state that the locking claws 43 of the receiving claws 42 of the grommet 11 are in engagement with the corner portions 23 of the grommet locking pieces 22 of the holder main body 10. As this occurs, the flange 34 of the grommet 11 is in such a state that the flange 34 is fitted in the opening 14a in the roof lining 5.

Since this allows the roof lining temporary fastening pieces 40 of the grommet 11 to be opened further outwards than the flange 34, the roof lining 5 is prevented from being dislocated upwards. Of course, in this state, the roof lining 5 is prevented from being dislocated further downwards than the roof lining abutment portion 19 of the holder main body 10. Incidentally, as this occurs, the clearance C is secured between the roof lining abutment portion 19 of the holder main body 10 and the roof lining temporary fastening pieces 40 of the grommet 11.

Then, when the roof lining 5 which is now attached to the sun visor holder 9 in the way described above is fixed to the roof portion 2 of the body, in the event that the grommet 11 is pushed into the opening 14b in the body panel 13 from the tapered portion 27, the arm portions 36 of the body panel engagement portions 35 of the grommet 11 are pushed inwards. Therefore, a circumferential edge of the opening 14b rides on the locking projections 37 and is guided downwards along the lower sloping surfaces 38. Then, the body panel 13 is brought into abutment with the roof lining 5 as shown in FIG. 9 and the roof lining 5 is centered by virtue of elastic force of the locking projections 37 which attempts to expand outwards and is then held in place.

Figure 9:
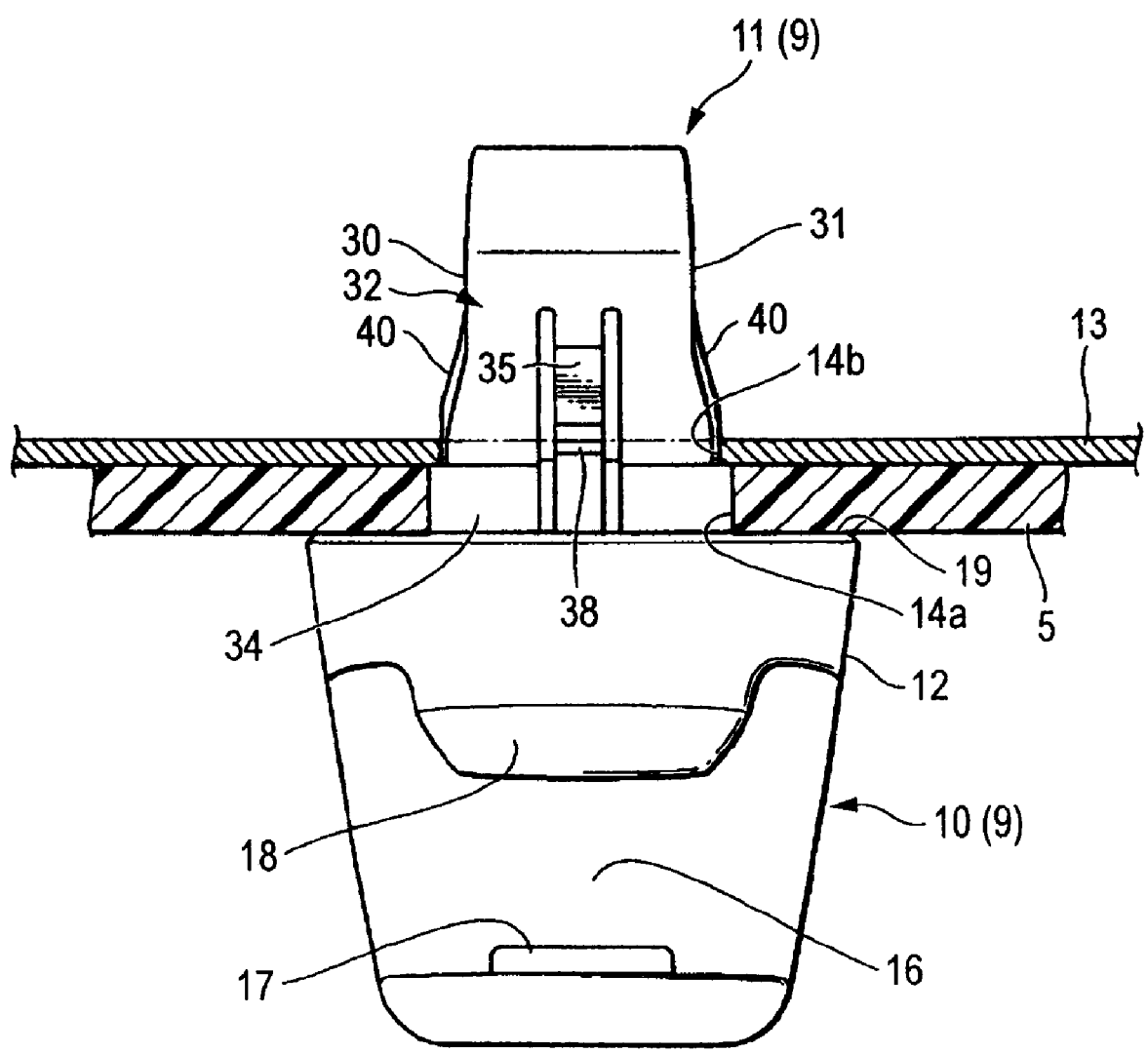
FIG. 9 is a front view showing a properly assembled state of the sun visor holder.

Here, as the body panel engagement portions 35 are displaced inwards, the opening angles of the roof lining temporary fastening pieces 40 of the grommet 11 are gradually decreased in such a state that the roof lining fastening pieces 40 are in elastic contact with the circumferential edge of the opening 14b in the body panel 13, and in such a state that the opening 14b in the body panel 13 is in abutment with the roof lining 5 as shown in FIG. 9, the distal end portions of the roof lining temporary fastening pieces 40 are hooked on the circumferential edge of the opening 14b in the body panel 13 with an elastic force. Therefore, the grommet 11 is centered in the longitudinal direction, and the motions of the roof lining temporary fastening pieces 40 in the opening direction are prevented. Namely, the distal end portions of the roof lining temporary fastening pieces 40 are positioned inside the opening 14b in the body panel and further upwards than the lower surface of the body panel 13 and further downwards the upper surface of the body panel 13.

Consequently, since the holding of the roof lining 5 to the body panel 13 is implemented by only the grommet 11, when the sun visor holder 9 is attempted to be used on bodies of vehicles of various model lines which have different body panels 13, the sun visor holder 9 can be applied to the vehicles of various model lines by replacing the grommet 11 which matches the body panels 13 of the vehicles of model lines with the holder main body 10 allowed to remain as the common part, whereby the versatility of the sun visor holder 9 can be enhanced and the number of parts involved can be reduced.

In addition, in the temporarily assembled state in which the sun visor holder 9 is locked only on the roof lining 5, since the clearance C is set between the roof lining abutment portion 19 of the holder main body 10 and the upper surface of the roof lining 5, in a properly assembled state in which the sun visor holder is attached to the body panel 13, the assemblage of the sun visor holder 9 to the body panel 13 can be confirmed at a point in time at which the clearance C becomes nil. Therefore, the assembling work is facilitated, and there is caused no fear of erroneous assemblage.

Consequently, in this state, since although the roof lining temporary fastening pieces 40 are locked on the body panel 13 by the force with which they expand outwards, the roof lining temporary fastening pieces 40 exert no force on the roof lining 5, there is no risk that the roof lining 5 is damaged by the roof lining temporary fastening pieces 40. In addition, the length of the roof lining temporary fastening pieces 40 is set to such a length that the distal end portions thereof stay within the range equal to the thickness of the body panel 13 in the opening 14b thereof from the upper surface of the flange 34 of the grommet 11 in such a state that the roof lining temporary fastening pieces are pushed into the corresponding cut-out portions 39. Therefore, they are not locked relative to the body panel 13 in the vertical direction, whereby the grommet 11 can be dislocated upwards from the strut portion 15 of the holder main body 10 only by pushing the body panel engagement portions 35 inwardly.

Consequently, since it becomes possible to avoid a risk that the roof lining temporary fastening pieces 40 constitute a disruption to the removal of the grommet 11, the removal work of the grommet 11 during maintenance is facilitated.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A sun visor holder for holding detachably one end of a sun visor which is supported rotatably on a vehicle body at the other thereof, comprising:

a holder main body which includes a sun visor holding portion which detachably holds the one end of the sun visor; and a grommet adapted to be brought into engagement with the holder for fixing the holder main body to the vehicle body, the grommet comprising:

a roof lining temporary fastening piece which penetrates through an opening provided in a roof lining to thereby be brought into engagement with an upper surface of the roof lining; and a body panel engagement portion which is brought into abutment with an upper surface of a body panel, wherein a length of the roof lining temporary fastening piece is such that a distal end portion of the roof lining temporary fastening piece is positioned further upwards than a lower surface of the body panel and further downwards than the upper surface of the body panel when in an installed state and where the grommet is in the installed state, and wherein when the grommet is in the installed state in the body panel, the distal end of the roof lining temporary fastening piece is positioned inside the opening in the body panel such that the roof lining temporary fastening piece is pushed into a cut-out portion defined in a side wall of the grommet to thereby prevent the roof lining temporary fastening piece from moving to its natural extended state.

2. The sun visor holder as set forth in claim 1, wherein the holder main body comprises a roof lining abutment portion which abuts with the roof lining, and wherein a clearance is provided between a lower surface of the roof lining and the roof lining abutment portion of the holder main body in a grommet temporarily fastened state in which the roof lining temporary fastening piece is in engagement with the upper surface of the roof lining.

3. The sun visor holder as set forth in claim 1, wherein the opening provided in the body panel of the body is smaller than the opening provided in the roof lining.

\* \* \* \* \*